Nov. 7, 1961     J. HAGEN ET AL     3,007,294
APPARATUS FOR CONTINUOUSLY CLEANING, FILLING
AND SEALING AMPOULES AND LIKE CONTAINERS
Filed Jan. 19, 1960     4 Sheets-Sheet 1

Fig. 1

INVENTORS
Joseph Hagen
Wilhelm Pechmann
BY
Michael S. Striker
Attorney

United States Patent Office 3,007,294
Patented Nov. 7, 1961

3,007,294
APPARATUS FOR CONTINUOUSLY CLEANING, FILLING AND SEALING AMPOULES AND LIKE CONTAINERS
Joseph Hagen, Burscheid, Germany, and Wilhelm Pechmann, Birsfelden, Switzerland, assignors to Firma Sandoz A.G., Basel, Switzerland
Filed Jan. 19, 1960, Ser. No. 3,293
Claims priority, application Germany Jan. 23, 1959
29 Claims. (Cl. 53—167)

The present invention relates to an apparatus for continuously cleaning, filling and sealing a large number of ampoules and like containers.

An important object of the invention is to provide an apparatus for cleaning, filling and sealing of ampoules and like fluid containers which is constructed in such a way as to prevent contamination of cleansed ampoules before the completion of filling and sealing steps; which is capable of simultaneously processing very large numbers of ampoules; which may be utilized for the processing of differently dimensioned and configurated ampoules; which requires little supervision even if put to use for extended periods of time; and in which the processing of ampoules, beginning with the cleaning steps and terminating with the ejection of accurately filled and properly sealed ampoules, occurs in a series of rapidly following operations.

Another important object of the instant invention is to provide an apparatus of the above outlined characteristics in which the processing of ampoules may be carried out by exclusion of dirt, lubricants and other contaminants; and whose component parts are readily accessible for inspection, maintenance, repair or replacement, if necessary.

A further object of the invention is to provide a novel magazine for simultaneously receiving a large number of ampoules; to provide a novel arrangement of liquid distributing, ampoule filling and ampoule sealing means; and to provide a novel system of means for preventing mixing of various cleaning liquids at the adjacent treating and processing stations.

With the above objects in view, the invention resides essentially in the provision of a conveying element which is provided with guideways for removably supporting a series of elongated magazines each containing a large number of ampoules or like containers, the conveying element being installed in a stationary housing and defining with the latter an enclosed preferably annular chamber which may be subdivided into a series of adjacent compartments for the individual processing stations. The conveying element, preferably a drum or an endless link chain, advances the magazines in an endless path within the aforementioned chamber from a loading station, at which the magazines are inserted in a direction normally at right angles to the direction in which the conveying element advances, toward and past a number of processing stations at which the ampoules are cleaned, filled and ultimately sealed before advancing to the unloading or ejecting station which latter preferably coincides with the loading station. The loading and unloading stations are preferably provided in the upper half of the housing. The cleaning of the ampoules is preferably carried out by an assembly comprising a plurality of hollow needles which are mounted on and communicate with the interior of elongated distributor pipes connected to suitable sources of cleaning or rinsing liquid substances, each distributor pipe being preferably reciprocable toward and away from the ampoules at the corresponding cleaning station in order to move the needles into and out of the open ampoule ends. The filling of ampoules with a serum or other liquid may be brought about with the help of an assembly comprising reciprocable needles each of which is preferably connected with a separate pumping device for permitting accurate measuring of introduced liquid substance. The sealing assembly for the filled ampoules comprises suitable gripper means engaging with the open ends of a group of filled ampoules and a burner for each filled ampoule which heats and softens a portion of the ampoule and permits such stretching of the plasticized ampoule portion that the latter is transformed into a thin filament which is finally separated from the liquid-filled main body portion of the ampoule and is preferably automatically conveyed into a suitable receptacle, e.g. through an inclined chute or the like.

The novel features which are considered as characteristic for the invention are set forth in particular in the appended claims. The invention itself, however, both as to its construction and its method of operation, together with additional objects and advantages thereof, will be best understood from the following detailed description of two specific embodiments when read in connection with the accompanying drawings, in which:

Figure 1:
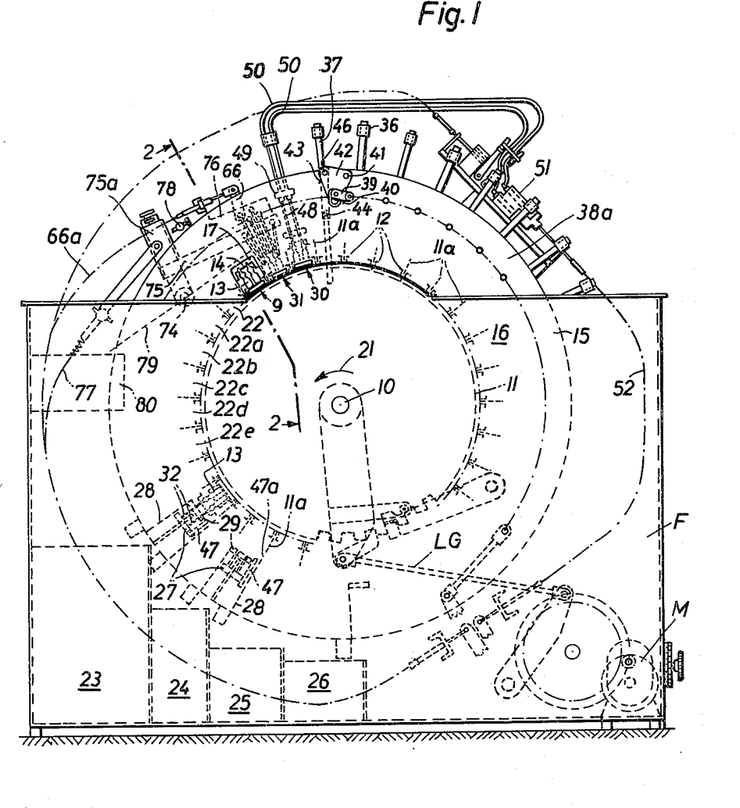
FIG. 1 is schematic front elevational view of an ampoule conveying, cleaning, filling and sealing apparatus embodying the invention which comprises a drum shaped conveyor for the ampoules, certain parts of the apparatus having been omitted from the sake of clarity.
Figure 2:
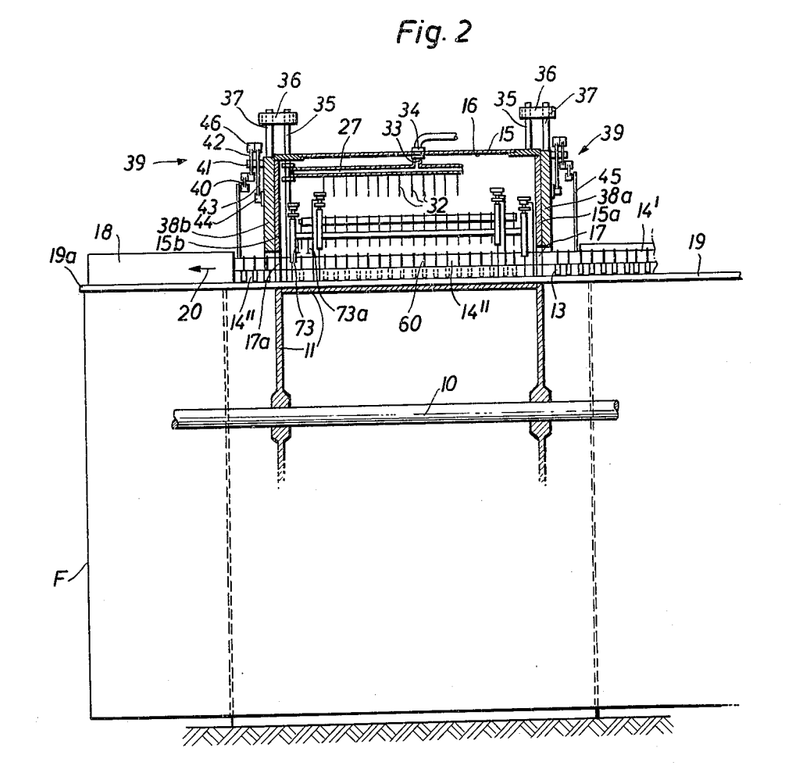
FIG. 2 is a fragmentary section taken substantially along the line 2—2 of FIG. 1, as seen in the direction of arrows, showing certain component parts in a cleaning compartment, in the sealing compartment, and in the loading-unloading compartment.

Referring now in greater detail to the drawings, and first to the embodiment of FIGS. 1 to 6, FIGS. 1 to 3 illustrate an ampoule conveying, washing, drying, filling, and sealing apparatus which comprises a horizontal shaft 10 rotatably supporting a conveyor here shown as a cylinder or drum 11 whose mantle or peripheral zone carries a series of axially parallel guideways or rails 12. The purpose of these guideways is to removably support a series of receptacles in the form of elongated magazines or trays 14 each of which contains a plurality of ampoules 13. For example, and as best shown in FIG. 2, each magazine or tray 14 may receive forty ampoules or like liquid containers 13 arranged in two rows which are parallel with the axis of the shaft 10 and with each of the guideways 12. The drum 11 is surrounded by a larger-diameter, stationary, concentric cylindrical housing 15 whereby the parts 11, 15 define therebetween an annular chamber or space 16 whose ends are closed by the end walls 15a, 15b with the exception of aligned apertures 17, 17a (see FIG. 2) serving as inlet and outlet, respectively, for the magazines 14. The end walls 15, 15a are perpendicular to the guideways 12. After insertion through the inlet aperture 17 in the end wall 15a, each magazine 14 describes a complete circle about the shaft 10 before being ejected or withdrawn from the space 16 through the discharge aperture 17a in the other end wall 15b of the housing 15. As is shown in FIG. 2, a magazine 14″ which has completed a full revolution in the annular space 16 may be ejected through the outlet 17a (in the direction indicated by the arrow 20) by a fresh magazine 14′ which latter is introduced through the inlet aperture 17. The drum 11 constitutes conveying means for advancing the ampoules in an endless path through the anular chamber 16.

Upon insertion of a new magazine (14′ in FIG. 2) into the space between a pair of guideways 12 which are momentarily aligned with the apertures 17, 17a at the loading-unloading station 9, the drum 11 is rotated in an endless path in the direction indicated by the arrow 21 (see FIG. 1) through an angle necessary for advancing the newly introduced magazine from the loading-unloading station 9 into the adjacent treating station 22. At this later station, the ampoules 13 are subjected to the first of a series of treatments. As a rule, the first treating step or steps will consist in a cleaning of the ampoules, e.g. rinsing with cold or hot water, with an acidic solution, with an alkaline solution, and so forth. To that end, the outer or supporting frame F of the apparatus houses a series of liquid sources in the form of tanks 23, 24, 25, 26 (see FIG. 1) each of which contains a different liquid substance necessary for the successive cleaning treatments to which the ampoules 13 are subjected while traveling with their magazines 14 about the shaft 10 in the direction of arrow 21. Each of tanks 23 to 26 supplies liquid to a separate distributor pipe 27 located at the corresponding treating station in the chamber or space 16, the liquid supplying means including pumping devices 33a (one of which is shown schematically in FIG. 6) and conduits, such as the flexible hoses 33 which will be described in greater detail hereinafter. The open upper ends of tanks 23-26 communicate with the corresponding compartments in the chamber 16. Alternately, the tanks may be installed in the chamber 16, i.e. mounted in the stationary housing 15.

The adjacent treating stations in the annular space or chamber 16 are separated from each other by radially arranged partitions or walls 28 which extend the full length of the drum 11, i.e., between the end walls 15, 15a. One longitudinal edge of each partition 28 is connected to the inner side of cylindrical housing 15 and its other longitudinal edge to needle guides or braces 29 which latter extend in the axial direction of the housing 15 and connect the end walls 15a, 15b with each other. The planes of braces 29 are perpendicular to the planes of partitions 28 (see particularly FIG. 6). By being connected to both end walls of the housing 15, the braces simultaneously serve as a means for stiffening the entire apparatus. As is shown in FIG. 1, the mantle of the rotary conveyor or drum 11 supports a series of radially arranged partitions or dividers 11a, e.g. plates made of sheet metal or the like, each such divider being inserted between a pair of adjacent guideways 12 and cooperating with one of partitions 28 to divide the space 16 into a series of segmental compartments for the individual treating stations. The dividers 11a extend the full length and in avial direction of the drum 11. As shown, each divider 11a defines with the momentarily aligned partition 28 an elongated, comparatively narrow, passage for gap 47a which enables the drum 11 to rotate with respect to the stationary housing 15 and stationary partitions 28 when it is desired to move a magazine 14 to the next treating station. Each gap 47a is adjacent to the longitudinal end face of a brace member or needle guide 29.

The individual treating stations are immediately adjacent to each other, i.e. they are separated only by rotary dividers 11a and by stationary partitions 28. At each of these treating stations (i.e. in each of the compartments defined by the mantle of the drum 11, by the cylindrical housing 15, by the latter's end walls 15a, 15b, by a pair of adjacent partitions 28, and by a pair of adjacent dividers 11a), the ampoules 13 carried by a magazine or tray 14 may be subjected to a different treatment, the nature of such treatment depending, of course, on many factors as will be readily understood by persons skilled in the art. For example, in the first step the ampoules advanced from the loading-unloading station 9 into the next treating station 22 may be rinsed with warm water. At the next treating station 22a, i.e. upon a further stepwise angular advance of the drum 11 in the direction of arrow 21, the ampoules may be rinsed with an acidic solution. Upon advancing into the next compartment (station 22b), the ampoules may be subjected to the action of an alkaline solution which neutralizes all traces of the acidic substance utilized in the treatment at the station 22a. The treatment progresses upon successive intermittent angular movements of the drum 11 in the direction of arrow 21, e.g., the ampoules 13 may be dried at the treating station 22c, thereupon silicated at the next treating station 22d, subjected to the action of an inner gaseous medium at the station 22e, and so forth. Such and similar treatments of intermittently advancing ampoules 13 are continued at the successive stations until the ampoules reach the filling station 30 which is preferably located exactly at, or near to, the apex or uppermost point of the rotary drum 11. In the next step, the filled ampoules are moved to the sealing station 31 and thence back to the loading-unloading station 9 to be ejected with their tray 14″ by a new tray 14′ through the discharge aperture 17a (arrow 20) in the manner as described hereinabove in connection with FIG. 2. The ejected magazine or tray 14″ may be brought to a halt in a suitable container 18 on the supporting frame F.

Figures 3, 4, 5, 6:
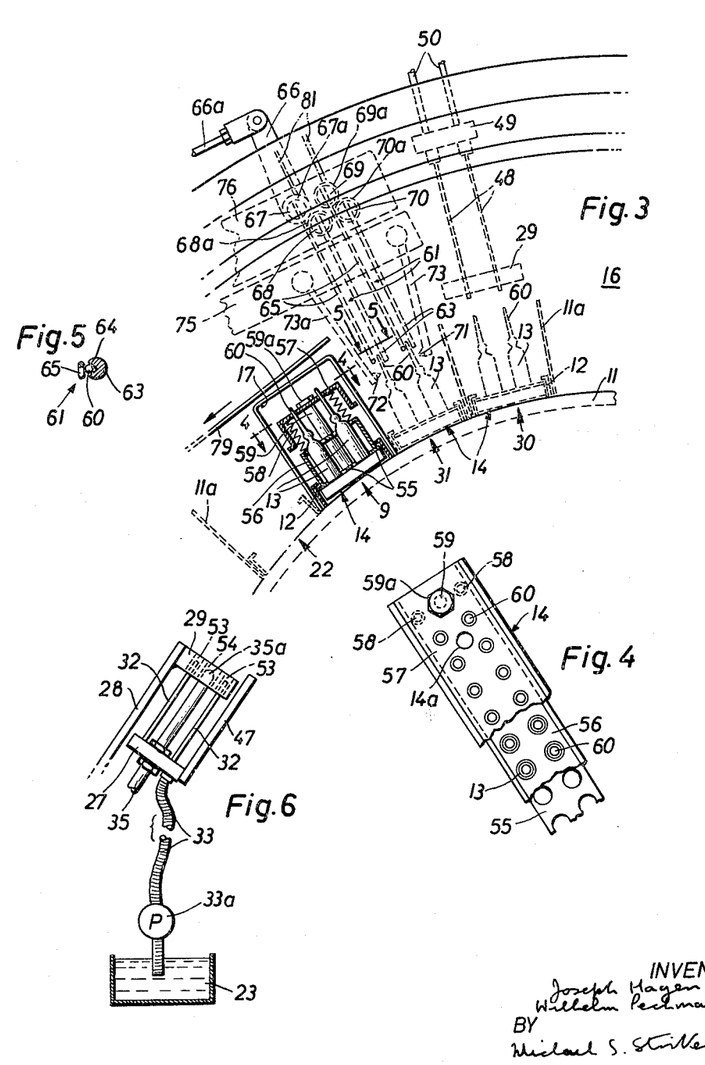
FIG. 3 is an enlarged fragmentary detail view of the ampoule filling, sealing and loading-unloading stations forming part of the apparatus shown in FIGS. 1 and 2.
FIG. 4 is an enlarged fragmentary top plan view of a special magazine or tray for two parallel rows of ampoules as seen in the direction of arrows from the line 4—4 of FIG. 3.
FIG. 5 is an enlarged section taken along the line 5—5 of FIG. 3, as seen in the direction of arrows, illustrating the gripper means for holding the open end of an ampoule during the sealing operation.
FIG. 6 illustrates on a larger scale a system for simultaneously rinsing or filling a number of ampoules with a liquid substance.

With the exception of the loading-unloading station 9, of the filling station 30, and of the sealing station 31, each of the remaining treating stations in the annular chamber or space 16 preferably comprises a distributor pipe 27. As is best shown in FIG. 6, each distributor pipe 27 carries a number of hollow rinsing or liquid-introducing needles 32 arranged in two rows so as to simultaneously introduce a liquid substance into all ampoules 13 carried by a magazine 14. The conduit 33 connects the distributor pipe 27 with the pressure side of a pump 33a which causes a liquid in say the tank 23 to flow into the hollow needles 32 and thence into the spears 60 of ampoules 13 at the corresponding treating station, for example, at the first cleaning or rinsing station 22. It is often preferred to utilize flexible hoses for the supply conduits 33 but, and as shown in FIG. 2, it is advisable to weld short sleeve-like tubular members 34 to the housing 15 at each point where a flexible hose 33 passes therethrough. The purpose of sleeves or tubes 34 is to prevent leakage of fluid and also to prevent or reduce communication of atmospheric air through the bores in stationary housing 15.

The ends of each distributor pipe 27 are carried by a pair of radial bolts 35 (see FIG. 2) which extend outwardly and through the housing 15. Each bolt 35 is parallel with and is connected to a guide bolt 37 by means of a crossbar 36 or the like. The guide bolts 37 are externally adjacent to the end walls 15a, 15b of the housing 15. Immediately adjacent to the outer sides of end walls 15a, 15b, there is provided a pair of rotary annular discs 38a, 38b each of which is connected with a number of spaced lever systems or link trains 39. Two link trains 39 are provided for each such treating station which comprises a distributor pipe 27, i.e. one of two link trains 39 for each pipe 27 is articulately connected with the rotary disc 38a and the other with the disc 38b. Each of these link trains is further connected with the corresponding guide bolt 37 in such a manner as to cause radial movements of the member 37 toward and away from the mantle of the drum 11 together with the associated bolt 35 in order to move the respective distributor pipe 27 toward and away from the ampoules 13 in a magazine 14 located in a selected treating compartment. Each link train 39 comprises a link 40 which is articulately connected to a plate-like triangular second link 42, the latter being swingable about a pivot axle 41 carried by the disc 38a or 38b. The articulate connection between a guide bolt 37 and the plate-like link 42 consists of a shackle or pull rod 43; this rod is articulately fixed by a pin 44 to the guide bolt 37 and by a pin 46 to the plate-like link 42. The link 40 is operable by a radial actuating rod 45 which extends into the supporting frame F.

When it is desired to move the distributor pipes 27 toward or away from the mantle of the drum 11, the discs 38a, 38b are caused to describe comparatively small angular movements under the action of actuating rods 45. For example, the discs are turned in a direction to the right (FIG. 1) when the pipes 27 should move toward the drum 11 whereby the links 40 swing the members 42 about their respective pivot axles 41. The members 42 are connected with the corresponding shackles 43 by aforementioned pins 46 and push the members 43 in a direction toward the mantle of the drum 11. As before stated, a pair of link trains 39 is provided at each such treating station which comprises a distributor pipe 27, i.e. at each treating station with the exception of the loading-unloading station 9 and of stations 30, 31. After the drum 11 has been caused to advance the magazines 14 to the next treating stations, it automatically triggers a movement of actuating rods 45 and a corresponding angular movement of the discs 38a, 38b in such a way that the discs move the bolts 35 radially inwardly and toward the magazines 14, i.e. toward the shaft 10. The innermost ends 35a of the bolts 35 are slightly conical (see FIG. 6); these conical ends 35a enter into aligned cutouts or bores 14a formed in the magazines 14 in order to positively hold the magazines in requisite position with respect to the distributor pipes 27. Such arrangement insures that the hollow needles 32 carried by the distributor pipes 27 enter through the open ends of spears 60 which form part of the ampoules 13 when the distributor pipes are moved by the discs 38a, 38b and by corresponding link trains 39 in a direction toward the respective magazines 14. As soon as the needles 32 enter the corresponding ampoules 13, the pumps 33a begin to deliver fluid into the flexible conduits 33 and through the latter into the corresponding distributor pipes 27. These pipes convey the fluid into the needles 32 and there-through into the interior of the ampoules. It is desirable to carry out the treatment with various liquid substances in the lower half of the annular space 16, i.e. in that half in which the ampoules are at least partially inverted, because the liquid is then free to flow by gravity back into the corresponding tanks located in the outer supporting frame F.

In order to prevent any mixing of fluids utilized at the adjacent treating stations, the aforementioned passages or slots 47a between the dividers 11a and aligned partitions 28 may be temporarily sealed as follows: The distributor pipe 27 at each station where the ampoules 13 are treated with a liquid substance carries a substantially radial sheet-metal or like baffle plate 47 (see FIGS. 1 and 6) which extends toward and slightly beyond the brace 29 when the distributor pipe 27 is withdrawn by its respective bolts 35 in a direction away from the mantle of drum 11. Each baffle plate 47 extends the full length of the annular space 16 and, whenever the pipes 27 are withdrawn, does not interfere with rotary movements of the dividers 11a (see FIG. 1). However, when the pipes 27 move in a direction toward the drum 11, i.e. when the latter is arrested, the baffle plates 47 slide along the outermost portions of dividers 11a and seal the passages or gaps 47a to thus prevent communication of different liquids contained in the adjacent compartments. Consequently, the liquids introduced into the compartments of adjacent treating stations may flow along the dividers 11a, baffles 47 and partitions 28 to be collected in the corresponding tanks and to be thereupon recirculated by the corresponding pump means 33a back into the distributor pipes 27. Thus, the baffles 47 prevent the warm water utilized at the station 22 from mixing with an acidic solution used at the station 22a, and so forth. A baffle 47 is provided at that side of each compartment in the chamber 16 along which the liquid flows by gravity from the open ends of the ampoules. For example, in the compartments of stations 22—22e the baffles 47 are provided along the left-hand or lower partitions 28. Of course, the apparatus may operate without such baffles, particularly if the steaming liquids are not recirculated but are used for cleaning only one group of ampoules, i.e. if the pumps 33a are connected to sources of fresh liquid. It is equally possible to omit the dividers 11a and to extend the baffles 47 all the way to the mantle of the drum 11 whenever the latter comes to a halt, or to separate the adjacent compartments only by the stationary partitions 28. Of course, the latter cannot extend all the way to the drum 11 because such arrangement would hinder the advance of magazines 14 in the annular space 16.

The mounting of filling needles 48 at the filling station 30 (see FIGS. 1 and 3) is somewhat different from the mounting of aforementioned rinsing needles 32 at the various cleaning stations. Thus, the interior of hollow filling needles 48 does not communicate with the interior of their reciprocable carrier 49 whose outward appearance somewhat resembles that of a distributor pipe 27. The carrier 49 merely serves as a means for supporting and for radially reciprocating the filling needles 48 each of which is connected with a separate conduit 50 leading to one of a series of ampoule filling pumps 51. In this manner, the quantity of a medicine, serum or other fluid substance which ultimately fills the ampoules 13 may be measured and controlled with great accuracy before the ampoules are sealed at the station 31. Each ampoule filling pump 51 may be operated by means of a Bowden wire 52 or the like. The provision of separate pumping devices for each rinsing needle 32 at the various cleaning stations is not necessary since the cleaning liquids need not be measured but are continuously introduced into the ampoules for a period of time considered necessary to complete a certain cleaning step. Therefore, a single pumping device 33a can serve all the needles 32 at a cleaning station by supplying liquid to the corresponding distributor pipe 27.

An important condition for satisfactory operation of the improved apparatus is to insure that the ampoules carried by their respective trays 14 remain in such position at each of the consecutive treating stations as to allow unobstructed introduction and withdrawal of needles 32 and 48. It was mentioned hereinabove that the bolts 35 are formed with slightly conical end portions 35a (see FIG. 6) which enter the aligned bores 14a formed in the magazines 14 (FIG. 4) when the distributor pipes 27 are caused to advance in a direction toward the mantle of the drum 11, i.e. when the drum is arrested after moving each set of ampoules 13 to a next treating station. In addition, the braces 29 are formed with openings 53, 54 for guiding the needles 32, 48 and the bolts 35, respectively (see FIG. 6), when the respective pipes 27 are caused to move toward the drum 11. In FIG. 6, the pipe 27 is shown in its outermost position, and it can be observed in FIG. 1 that the braces 29 are located substantially midway between a tray 14 and the distributor pipe 27 when the latter is in the position of FIG. 6. The diameters of guide openings 53, 54 are selected with a view to restrict the needles 32, 48 and the bolts 35, respectively, to radial movements toward and away from the axis of the shaft 10; this insures more accurate positioning of the needles with respect to the spears 60 of ampoules at the corresponding treating stations.

Referring now to FIGS. 3 and 4, each magazine 14 comprises a perforated bottom plate or base 55, made of sheet metal or the like, which rigidly supports a perforated substantially U-shaped sheet metal or like plate member 56. A perforated U-shaped third plate member 57 is located above the member 56 and is constantly biased in a direction away from the latter by a series of helical resilient elements 58 (see also FIG. 3). Upon exertion of a given force, the outer U-shaped member 57 may be moved against the bias of springs 58 in a direction radially toward the mantle of the drum 11. The bottom plate 55 is slidably retained by a pair of guideways 12. The movements of the member 57 under or against the bias of springs 58 are controlled by guide pins 59 which are anchored in members 55, 56 and whose enlarged heads 59a limit outward movements of the member 57 in a direction away from the member 56. All three components 55, 56, 57 of each magazine or tray 14 are formed with aligned perforations or openings for the ampoules 13, the latter being insertable through the maximum-diameter openings in the bottom member or component 55. The openings in the median component 56 are somewhat smaller so that said member engages the customary shoulders between the main body portion and the spear 60 of each ampoule. The diameters of openings in the reciprocable top member 57 are even smaller, i.e. just sufficient to snugly receive the spear 60 of an ampoule. The bores 14a for the conical ends 35a of bolts 35 are provided in the uppermost plate member 57 close to each longitudinal end of the magazine 14.

The sealing of ampoules 13 at the station 31 is carried out as follows: The sealing means comprises two rows of elongated grippers or tongs 61, one for each upright or nearly upright ampoule held by a magazine 14, and each adapted to engage a spear 60. Each gripper 61 comprises a rod 63 of circular cross-sectional contour which is formed with a sector-shaped groove 64, and a resilient wire 65 whose lower end is bent substantially at right angles to its main body portion in a manner best shown in FIG. 5. The opening and closing of each gripper 61, i.e. the movements of a wire 65 and a rod 63 toward and away from each other, are brought about by an actuating lever 66 which is fixed to and is adapted to rock a shaft 67; the latter also carries the wires 65 for a full row of rods 63, i.e. ten wires. The shaft 67 further mounts gears 67a meshing with the gears 68a on a second shaft 68 which latter supports the rods 63 cooperating with the wires 65 carried by the shaft 67. Suitable gears 69a, 70a transmit rotation of shafts 67, 68 to shafts 69, 70, respectively, which mount the second row of wires 65 and rods 63. As stated hereinabove, the apparatus shown in FIGS. 1 to 3 utilizes magazines 14 containing two rows of ampoules; therefore, the sealing means must comprise two rows of grippers 61 each consisting of a rod 63 and a wire 65.

The sealing means further comprises two rows of electrodes or burners 73, 73a provided with tips 71, 72 respectively. The burners 73, 73a are mounted on a supporting arm 75 (FIGS. 1 and 3) which is pivotable about a pin 74. When a set of newly filled ampoules 13 is advanced by the drum 11 from the filling station 30 to the sealing station 31, the normally open grippers 61 whose shafts 67—70 are carried by an arm 76 (which latter is also mounted for pivotal movements about the pin 74) are pivoted by the latter in a direction toward the drum 11 into the position of FIG. 5 in which each of the grippers 61 is free to engage the spear 60 of a selected ampoule upon movements of its component parts 63, 65 toward each other. As can be observed in FIG. 3, the parts 63, 65 engage the open ends of the spears 60 above the tips 71, 72 of respective burners 73, 73a. During the closing movement of each gripper 61, the upper end of a spear 60 is received in the groove 64 and the bent lower end of the corresponding wire 65 retains the spear in such position. When the grippers 61 engage with the spears 60, the burners 73, 73a assume the position of FIG. 3 and heat the material of each spear sufficiently so that the latter becomes soft, i.e. readily deformable. As soon as the material of spears 60 assumes a plastic state, a Bowden wire 77 is operated and pivots the arm 76 to such an extent as to slightly stretch the spears 60 by moving the grippers 61 in a direction away from the magazine 14 located at the sealing station 31. The burners 73, 73a on the arm 75 do not immediately follow the pivotal movements of grippers 61; however, when an adjustable stop 78 carried by the arm 76 comes into abutment with the angular extension 75a of the arm 75, the latter also begins to pivot about the pin 74 and the burners or electrodes 73, 73a follow the outward movement of the grippers 61. The adjustable stop 78 may consist of a lug carried by the arm 76 and having a tapped bore meshing with a threaded bolt or the like which latter may engage with the angular extension 75a. As the arms 75, 76 pivot in unison, the deformable zones of spears 60 are stretched into thin threads and the head of each spear is finally separated from the remaining major portion of the corresponding ampoule. By stretching the plasticized portions of spears 60 into the form of thin threads, the open ends of ampoules are properly sealed while the grippers 61 still retain the separated end portion or head of each spear. When the sealing step is completed, the arm 76 (and hence also the arm 75) continues to advance into its outermost position which is selected in such a way that the separated portions or heads of spears 60 drop into a chute 79 as soon as the gears 67a, 68a, 69a and 70a are rotated in a direction to move the resilient wire members 65 away from their associated rods 63. The chute 79 conveys the discharged spear ends or heads into a container 80. The opening of grippers 61 is effected by the aforementioned lever 66 over a further Bowden wire 66a.

A newly filled group of ampoules 13 is advanced into the sealing station 31 while the grippers 61 and the burners 73, 73a remain in their uppermost position. The bolts 81 (FIG. 3) correspond to the bolts 35 and hold a magazine 14 in requisite position during the sealing operation. The Bowden wire 77 is then operated again to move the arms 75, 76 in downward direction and to thereby advance the grippers 61 together with the burners 73, 73a into requisite position for engagement with the spears of newly filled ampoules 13. The actual engagement of spears 60 by the rods 63 and wires 65 occurs under the action of the Bowden wire 66a and lever 66. The arm or lever 75 and the burners 73, 73a follow by gravity each downward movement of the lever or arm 76. Of course, the bolts 81 at the sealing station 31 need not support a distributor pipe but merely serve as a means for fixing the magazine 14 in requisite position and for exposing the spears 60 of all ampoules at said station.

In the normal course of operation, e.g. at the loading-unloading station 9, the uppermost plate member 57 of each magazine 14 is held at such a distance from the U-shaped plate member 56 as to nearly completely conceal the spears 60 of all ampoules (see the full-line magazine 14 in FIG. 3). However, since the operation of the aforedescribed sealing means at the station 31 requires a greater exposure of each spear 60, the outermost plate member 57 of the magazine 14 momentarily located at the sealing station 31 must be depressed against the bias of springs 58 in a direction toward the median plate member 56 to in such manner expose more than merely the open upper end portions or heads of the spears. The movements of the U-plate member 57 against the action of springs 58 are brought about by the aforementioned radially reciprocable bolts or pins 81 whose lower ends enter the bores 14a in the plate member 57. The exposed areas of or, preferably, the entire spears are then readily accessible to the grippers 61 and to the burners 73, 73a. The bolts 81 may move the plate member 57 close to the median plate member 56, i.e. they may expose the entire spear 60 all the way to the customary shoulder of each ampoule which separates the spear from the main body portion.

Referring back to FIG. 2, the outer frame F is formed with rails 19 for guiding a newly loaded magazine 14' in a direction toward the inlet aperture 17, and with rails 19a which lead a magazine 14" when the latter is ejected through the discharge aperture 17a. In order to avoid a deformation of magazines and eventual breakage of ampoules during the passage through one of the apertures 17, 17a, for example, if a magazine should become stuck in the rails 19 or 19a while the conveying drum 11 is in motion, the apparatus comprises a non-represented control system which is operatively connected with the driving motor M and arrests the latter whenever an irregularity is detected in the course of operation. The drum 11 is intermittently rotated by a schematically represented system of levers, gears and toothed racks LB which is shown in FIG. 1 and whose exact construction forms no part of this invention. FIG. 1 further shows that the entire apparatus, particularly the drum 11, the housing 15, the discs 38, 38a, and the lever systems 39, are preferably of symmetrical design. The various Bowden wires may be operated by hand or by a suitable automatic control system which brings about the movements of parts 27, 66, 75, 76 etc. in a predetermined sequence.

The apertures 17, 17a are provided in the upper halves of end walls 15a, 15b, i.e. they communicate with the upper half of the chamber 16.

Figure 7:
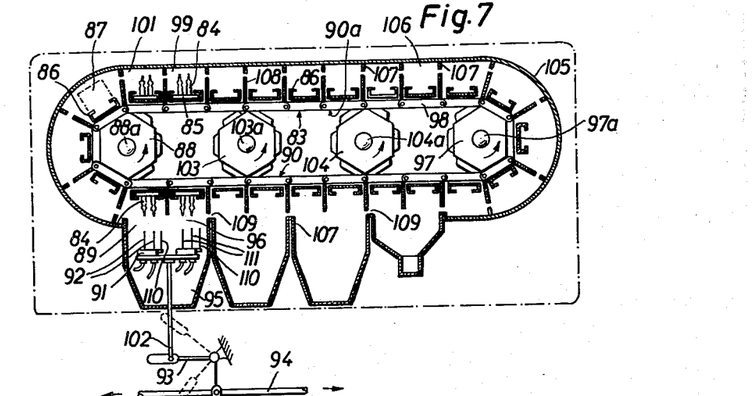
FIG. 7 is a schematic front elevational view of a modified apparatus embodying the invention which utilizes a link-chain type endless conveyor for the ampoules.
Figure 8:
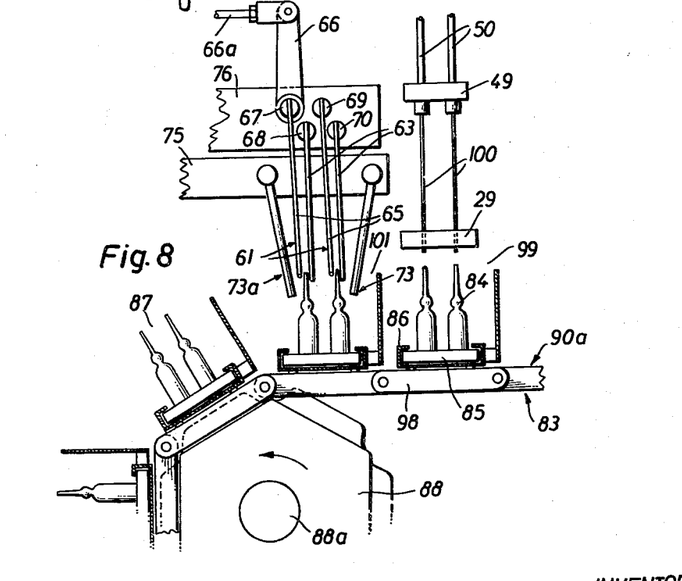
FIG. 8 illustrates on a larger scale three adjacent stations in the apparatus of FIG. 7.

The apparatus of FIGS. 7 and 8 utilizes a link chain 83, sometimes called a steel side-bar chain, which replaces the rotary conveying drum 11 and which also travels in an endless path in a vertical plane. The ampoules 84 are carried by magazines 85 whose construction may be identical with that of the magazine 14 shown in FIG. 4. Each link or side-bar 98 of the chain 83 carries guideways or rails 86 which slidably receive the magazines 85 for movements in a direction transverse to the direction in which the ampoule conveying chain 83 rotates. The loading- un-loading station is identified by the reference numeral 87; this station is located adjacent to the left-hand driving sprocket 88, i.e. at the end of the upper run 90a of the conveying chain 83. The first treating station 89 is located at the left-hand end of the lower run 90. As shown, the runs, 90, 90a extend in parallel horizontal planes. The hollow needles 92, carried by and communicating with a distributor pipe 91, are reciprocated toward and away from the spears of ampoules 84 in a manner somewhat different from that described in connection with FIGS. 1 to 3 and 6. The means for moving the distributor pipe 91 comprises a link train 93 which is operated by a reciprocable actuating rod 94. The rod 94 may reciprocate all distributor pipes utilized at the various stations along the upper run 90a and the lower run 90, or a separate reciprocating means may be provided for the distributor pipes in each run of the conveyor chain 83. The cleaning or rinsing fluid introduced into the ampoules by the hollow needles 92 is free to flow along the walls at the station 89 and is accumulated in a funnel-shaped receptacle or tank 95 whence it is recirculated into the pipe 91, e.g. by a nonrepresented pumping device similar to the pump 33a shown in FIG. 6. The second treating station 96 is immediately adjacent to the cleaning station 89 and, in the embodiment of FIG. 7, utilizes the same type of cleaning fluid. Thus, the fluid collected by the tank 95 is also circulated into the needles 111 at the station 96.

Otherwise, the arrangement of FIGS. 7 and 8 differs only slightly from the construction which is shown in FIGS. 1 to 3. The cleaning treatments of inverted ampoules are continued at the successive stations located along the lower conveyor run 90. After the thoroughly cleaned ampoules advance along the second driving sprocket 97, they are dried, subjected to the action of certain gases, and so forth while traveling in upright position along the upper run 90a. In the next-to-last station 99 before the loading-unloading station 87 (see FIG. 8), the ampoules are filled with a liquid substance, e.g. a medical preparation, by means of filling needles 100 substantially in the manner as shown in FIGS. 1 to 3, i.e. through separate conduits, one for each filling needle 100. In the last station 101, the ampoules 84 are sealed with the help of grippers 61 and burners or electrodes 73, 73a in the same manner as described hereinbefore.

According to a slight modification of the construction shown in FIG. 7, the bolts 102 which support the distributor pipes 91 at the treating stations 89, 96 and at the other treating stations along the lower conveyor run 90 may be provided with extensions similar to parts 35 and 81 which engage with the magazines 85 and hold the same during the introduction of needles 92, 111 into the open ends of ampoules 84. Similar rods may be provided at the filling station 99 to insure proper alignment of ampoules with the filling needles 100.

In order to insure uniform advance of the conveying chain 83 not only in the lower run 90 but also in the upper run 90a, the system of FIG. 7 comprises two intermediate driving sprockets 103, 104 in addition to the aforementioned driving sprockets 88, 97 which are located at the end turns of the conveyor. These intermediate sprockets 103, 104 engage with both runs of the conveyor and their horizontal shafts 103a, 104a are coupled with the horizontal shafts 88a, 97a of sprockets 88, 97, respectively, in such a way as to insure absolute synchronism in the movements of all driving sprockets.

The conveyor chain 83 is surrounded by a stationary housing 105 defining therewithin a chamber or space 106. The individual treating stations are separated by sheetmetal or like partitions 107 which are connected to and extend inwardly from the housing 105. Each partition 107 extends the full length of the housing. The conveyor chain 83 carries radial walls or dividers 108 each of which is aligned with a partition 107 when the chain comes to a halt between two successive angular advances. The dividers 108 also extend the full length of the housing 105 and define with partitions 107 narrow elongated gaps 109 which are sealable by baffle plates 110 carried by the distributor pipes 91 in the same manner as the baffles 47 seal the gaps 47a in the apparatus of FIGS. 1 to 3.

An important advantage resulting from the provision of a housing 15 or 105 which surrounds the stepwise advancing conveying means for the ampoules is in that the housing positively prevents entry of foreign matter, such as dust and certain other contaminants, into the chamber (16 or 106) which surrounds the conveying means and houses the various treating stations. Owing to generation of water vapors or other vapors at the various cleaning stations, the pressure in the chamber 16 or 106 normally exceeds atmospheric pressure which also contributes to the exclusion of foreign matter from the apparatus. A satisfactory sealing of the chamber 16 or 106 is particularly important if the ampoules are filled with a pharmaceutical liquid since the processing of such ampoules clearly necessitates a readily cleanable and fully sterilized apparatus. The ampoules may be made of a metal, of glass or of a suitable synthetic plastic substance.

It will be readily understood that the systems described in connection with FIGS. 1 to 8 may utilize an arrangement of stationary distributor pipes and that the magazines are then movable toward and away from the needles carried by such stationary pipes. However, it is usually more convenient and therefore preferred to reciprocate the distributor pipes and the filling needles with respect to magazines which are held against movement by the conveying means.

As can be observed in FIGS. 1 and 7, it is preferred to provide all drive means for the movable component parts of the apparatus (such as the conveying means, the distributor pipes, the grippers and the electrodes) externally of the chamber 16 or 106 and to connect the movable component parts with their respective drive means (e.g. with the motor M, the assembly LG, the pumps 33a, 51, etc.) by a series of flexible elements, such as Bowden wires and the like. Such arrangement results in lesser wear and tear upon the comparatively expensive and often sensitive drive means because the latter are not exposed to the constant action of gases and liquids contained in the chamber within the apparatus housing 15 or 105. In addition, by installing the drive means outside of the housing, the likelihood of contamination of ampoules with a lubricant or the like at the various treating stations is further reduced and the drive means is readily accessible for inspection, maintenance and repair.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptatons should and are intended to be comprehended within the meaning and range of equivalence of the following claims.

What is claimed as new and desired to be secured by Letters Patent is:

1. An apparatus for cleaning, filling and sealing of ampoules and like containers comprising, in combination: rotary conveying means mounted for movement in a substantially vertical plane; a plurality of magazines each removably holding a plurality of containers and each removably mounted on said conveying means; stationary housing means surrounding said conveying means and defining therewith a substantially annular nearly completely sealed chamber; a drive for intermittently advancing the conveying means and for thereby moving the magazines with the containers in said chamber; and means for cleaning, filling and sealing the containers, said last mentioned means mounted in said chamber and operable between successive advances of said conveying means, the extent to which said chamber is sealed being such that superatmospheric pressures develop in the chamber during the cleaning, filling and sealing of containers whereby atmospheric air is prevented from penetrating into said chamber.

2. An apparatus for cleaning, filling and sealing of ampoules and like containers comprising, in combination: rotary conveying means mounted for movements in an endless path disposed in a vertical plane; a plurality of guideways carried by said conveying means and extending at right angles to the direction in which the latter rotates; a plurality of elongated magazines each removably holding a plurality of containers and each removably mounted in one of said guideways; stationary housing means surrounding said conveying means and defining therewith a nearly completely sealed substantially annular chamber, said housing means formed with aperture means of an area sufficient to permit insertion and withdrawal of individual magazines from said chamber; a drive for intermittently advancing the conveying means and for thereby moving the magazines with the containers in said chamber; and means for cleaning, filling and sealing the containers, said last mentioned means mounted in said chamber, disposed in part below said conveying means and operable between successive advances of said conveying means, the extent to which said chamber is sealed being such that superatmospheric pressures develop in the chamber during the cleaning, filling and sealing of containers whereby atmospheric air is prevented from penetrating into said chamber.

3. An apparatus for cleaning, filling and sealing of ampoules and like containers comprising, in combination: rotary conveying means mounted for movement in a substantially vertical plane; stationary housing means surrounding said conveying means and defining therewith a nearly completely sealed substantially annular chamber; a plurality of substantially radial partitions carried by one of said means for subdividing said chamber into a plurality of compartments with at least one of the compartments disposed below said conveying means; a plurality of magazines each removably holding a plurality of containers and each removably mounted on said conveying means for movements through said chamber, said housing means formed with aperture means of an area sufficient to permit insertion and withdrawal of individual magazines from said chamber; a drive for intermittently advancing the conveying means and for thereby moving the magazines with the containers into successive compartments of said chamber; and means for cleaning, filling and sealing the containers, each said last mentioned means mounted in a separate compartment of said chamber and operable between successive advances of said conveying means, at least one of said last mentioned means being mounted in a compartment disposed below said conveying means and the extent to which said chamber is sealed being such that superatmospheric pressures develop in the chamber during the cleaning, filling and sealing of containers whereby atmospheric air is prevented from penetrating into said chamber.

4. An apparatus for cleaning, filling and sealing of ampoules and like containers of the type having a spear formed with an open end, said apparatus comprising, in combination: rotary conveying means mounted for movements in an endless path disposed in a substantially vertical plane; a plurality of guideways carried by said conveying means and extending at right angles to the direction in which the latter rotates; stationary housing means surrounding said conveying means and defining therewith a nearly completely sealed substantially annular chamber; a plurality of magazines, each removably holding a plurality of containers in such a way that the open ends of the spears are turned toward said housing means and each magazine removably mounted in one of said guideways for movements through said chamber, said housing means formed with aperture means of an area sufficient to permit insertion and withdrawal of individual magazines from said chamber; a drive for intermittently advancing the conveying means and for thereby moving the magazines in said chamber; and means for cleaning, filling and sealing the containers, each of said last mentioned means mounted in said chamber and operable between successive advances of said conveying means, at least one of said last mentioned means being disposed below said conveying means, said cleaning means comprising at least one elongated distributor pipe parallel with said guideways, a plurality of hollow liquid-introducing needles carried by and communicating with said pipe, there being one needle for each container carried by a magazine, a source of liquid connected with said pipe, pump means for causing the liquid to flow from said source and through said pipe to be discharged through said needles, and means for reciprocating said pipe toward and away from a magazine between successive advances of said conveying means whereby the needles are introduced into and withdrawn from the open ends of spears forming part of the containers carried by the magazine, the extent to which said chamber is sealed being such that superatmospheric pressures develop in the chamber during the cleaning, filling and sealing of containers whereby atmospheric air is prevented from penetrating into said chamber.

5. An apparatus for cleaning, filling and sealing of ampoules and like containers of the type having a spear formed with an open end, said apparatus comprising, in combination: rotary conveying means mounted for movements in an endless path disposed in a substantially vertical plane; a plurality of guideways carried by said conveying means and extending at right angles to the direction in which the latter rotates; stationary housing means surrounding said conveying means and defining therewith a nearly completely sealed substantially annular chamber, said housing means comprising two spaced parallel end walls disposed at right angles to said guideways; a plurality of magazines, each removably holding a plurality of containers in such a way that the open ends of the spears are turned toward said housing means and each magazine removably mounted in one of said guideways for movements through said chamber, said housing means formed with aperture means of an area sufficient to permit insertion and withdrawal of individual magazines from said chamber; a drive for intermittently advancing the conveying means and for thereby moving the magazines in said chamber; and means for cleaning, filling and sealing the containers, each of said last mentioned means mounted in said chamber and operable between successive advances of said conveying means, at least one of said last mentioned means being disposed below said conveying means, said cleaning means comprising at least one elongated distributor pipe parallel with said guideways, a plurality of hollow liquid-introducing needles carried by and communicating with said pipe, there being one needle for each container carried by a magazine, a source of liquid connected with said pipe, pump means for causing the liquid to flow from said source and through said pipe to be discharged through said needles, and means for reciprocating said pipe toward and away from a magazine between successive advances of said conveying means whereby the needles are introduced into and withdrawn from the open ends of spears forming part of the containers carried by the magazine, said reciprocating means comprising a pair of bolts parallel with said needles, connected to said pipe and each adjacent to one of said end walls, and means for shifting said bolts toward and away from the conveying means, the extent to which said chamber is sealed being such that super-atmospheric pressures develop in the chamber during the cleaning, filling and sealing of containers whereby atmospheric air is prevented from penetrating into said chamber.

6. An apparatus for cleaning, filling and sealing of ampoules and like containers of the type having a spear formed with an open end, said apparatus comprising, in combination: rotary conveying means mounted for movements in an endless path disposed in a substantially vertical plane; a plurality of guideways carried by said conveying means and extending at right angles to the direction in which the latter rotates; stationary housing means surrounding said conveying means and defining therewith a nearly completely sealed substantially annular chamber, said housing means comprising two spaced parallel end walls disposed at right angles to said guideways; a plurality of magazines, each removably holding a plurality of containers in such a way that the open ends of the spears are turned toward said housing means and each magazine removably mounted in one of said guideways for movements through said chamber, said housing means formed with aperture means of an area sufficient to permit insertion and withdrawal of individual magazines from said chamber; a drive for intermittently advancing the conveying means and for thereby moving the magazines in said chamber; and means for cleaning, filling and sealing the containers, each of said last mentioned means mounted in said chamber and operable between successive advances of said conveying means, at least one of said last mentioned means being disposed below said conveying means, said cleaning means comprising at least one elongated distributor pipe parallel with said guideways, a plurality of hollow liquid-introducing needles carried by and communicating with said pipe, there being one needle for each container carried by a magazine, a source of liquid connected with said pipe, pump means for causing the liquid to flow from said source and through said pipe to be discharged through said needles, and means for reciprocating said pipe toward and away from a magazine between successive advances of said conveying means whereby the needles are introduced into and withdrawn from the open ends of spears forming part of the containers carried by the magazine, said reciprocating means comprising a pair of bolts parallel with said needles, connected to said pipe and each adjacent to one of said end walls, and a link train connected with each of said bolts for shifting the same toward and away from the conveying means, each link train operatively connected with one of said bolts and located externally of said chamber adjacent to one of said end walls, the extent to which said chamber is sealed being such that super-atmospheric pressures develop in the chamber during the cleaning, filling and sealing of containers whereby atmospheric air is prevented from penetrating into said chamber.

7. An apparatus for cleaning, filling and sealing of ampoules and like containers of the type having a spear formed with an open end, said apparatus comprising, in combination: rotary conveying means mounted for movements in an endless path disposed in a substantially vertical plane; a plurality of guideways carried by said conveying means and extending at right angles to the direction in which the latter rotates; stationary housing means surrounding said conveying means and defining therewith a nearly completely sealed substantially annular chamber, said housing means comprising two spaced parallel end walls disposed at right angles to said guideways; a plurality of magazines, each removably holding a plurality of containers in such a way that the open ends of the spears are turned toward said housing means and each magazine removably mounted in one of said guideways for movements through said chamber, said housing means formed with aperture means of an area sufficient to permit insertion and withdrawal of individual magazines from said chamber; a drive for intermittently advancing the conveying means and for thereby moving the magazines in said chamber; and means for cleaning, filling and sealing the containers, each of said last mentioned means mounted in said chamber and operable between successive advances of said conveying means, at least one of said last mentioned means being disposed below said conveying means, said cleaning means comprising at least one elongated distributor pipe parallel with said guideways, a plurality of hollow liquid-introducing needles carried by and communicating with said pipe, there being one needle for each container carried by a magazine, a source of liquid connected with said pipe, pump means for causing the liquid to flow from said source and through said pipe to be discharged through said needles, means for reciprocating said pipe toward and away from a magazine between successive advances of said conveying means whereby the needles are introduced into and withdrawn from the open ends of spears forming part of the containers carried by the magazine, said reciprocating means comprising a pair of bolts parallel with said needles, connected to and extending beyond said pipe toward said conveying means, and each adjacent to one of said end walls, means for shifting said bolts with the pipe toward and away from said conveying means, and means for guiding said needles and said bolts in their movements toward and away from the conveying means, said guiding means comprising a brace member parallel with said guideways, having ends connected to said end walls, disposed between said pipe and said conveying means, and formed with openings adapted to snugly receive and guide said needles and said bolts, the extent to which said chamber is sealed being such that super-atmospheric pressures develop in the chamber during the cleaning, filling and sealing of containers whereby atmospheric air is prevented from penetrating into said chamber.

8. An apparatus for cleaning, filling and sealing of ampoules and like containers comprising, in combination: rotary conveying means mounted for intermittent movements in a substantially vertical plane; stationary housing means surrounding said conveying means and defining therewith a nearly completely sealed substantially annular chamber; a plurality of substantially radial dividers carried by said conveying means and extending toward but short of said housing means for sub-dividing the chamber into a plurality of equal compartments; a plurality of magazines, each removably holding a plurality of containers and each removably mounted on said conveying means in one of said compartments for movements through said chamber, said housing means formed with aperture means of an area sufficient to permit insertion and withdrawal of individual magazines from said chamber; a drive for intermittently advancing the conveying means and for thereby moving the magazines with the containers through said chamber; and means for cleaning, filling and sealing the containers, said last mentioned means mounted in said chamber, disposed in part below said conveying means and operable between successive advances of said conveying means, the extent to which said chamber is sealed being such that superatmospheric pressures develop in the chamber during the cleaning, filling and sealing of containers whereby atmospheric air is prevented from penetrating into said chamber.

9. An apparatus for cleaning, filling and sealing of ampoules and like containers comprising, in combination: rotary conveying means mounted for intermittent movements in a substantially vertical plane; stationary housing means surrounding said conveying means and defining therewith a nearly completely sealed substantially annular chamber; a plurality of equally spaced substantially radial partitions carried by said housing means and extending toward but short of said conveying means; a plurality of equally spaced substantially radial dividers carried by said conveying means and extending toward but short of said partitions, each divider being aligned with one of said partitions when the conveying means is at a standstill between successive intermittent movements whereby the dividers and the partitions subdivide the chamber into a plurality of compartments with at least one of the compartments disposed below said conveying means; a plurality of magazines, each removably holding a plurality of containers and each removably mounted on said conveying means between two adjacent dividers for movements through said chamber, said housing means formed with aperture means of an area sufficient to permit insertion and withdrawal of individual magazines from said chamber; a drive for intermittently advancing the conveying means and for thereby moving the magazines with the containers into successive compartments of said chamber; and means for cleaning, filling and sealing the containers, each of said last mentioned means mounted between a different pair of adjacent partitions on said housing means and operable between successive advances of said conveying means, at least one of said last mentioned means being mounted in a compartment disposed below said conveying means and the extent to which said chamber is sealed being such that superatmospheric pressures develop in the chamber during the cleaning, filling and sealing of containers whereby atmospheric air is prevented from penetrating into said chamber.

10. An apparatus for cleaning, filling and sealing of ampoules and like containers comprising, in combination: a horizontal shaft; a conveying drum having a cylindrical mantle and rotatably mounted on said shaft; a cylindrical housing surrounding said drum and defining with the latter a nearly completely sealed annular chamber extending about said mantle; a plurality of guideways mounted on said mantle and each parallel with said shaft; a plurality of elongated magazines each removably holding a plurality of containers and each removably mounted in one of said guideways for movements through said chamber, said housing formed with aperture means of an area sufficient to permit insertion and withdrawal of individual magazines from said chamber; a drive for intermittently rotating the drum and for thereby moving the magazines with the containers in said chamber; and means for cleaning, filling and sealing the containers, said means mounted on the housing, located in said chamber partially below said drum and operable between successive rotations of said drum, the extent to which said chamber is sealed being such that superatmospheric pressures develop in the chamber during cleaning, filling and sealing of containers whereby atmospheric air is prevented from penetrating into said chamber.

11. An apparatus for cleaning, filling and sealing of ampoules and like containers which comprises, in combination: an endless link chain; means for intermittently driving said chain in an endless path disposed in a vertical plane; a stationary housing surrounding said chain and defining therewith a nearly completely sealed substantially annular chamber; a plurality of guideways, each connected to one link of said chain and each extending at right angles to the direction in which the chain is driven; a plurality of magazines, each removably holding a plurality of containers and each removably mounted in one of said guideways, said housing formed with aperture means permitting insertion and withdrawal of individual magazines from said chamber; and means for cleaning, filling and sealing the containers, said means mounted in said chamber partially below said chain and operable between successive advances of the chain, the extent to which said chamber is sealed being such that superatmospheric pressures develop in the chamber during cleaning, filling and sealing of containers whereby atmospheric air is prevented from penetrating into said chamber.

12. An apparatus for cleaning, filling and sealing of ampoules and like containers which comprises, in combination: an endless link chain having two spaced end turns, a horizontal upper run, and a horizontal lower run; a driving sprocket at each end turn of said chain, each of said sprockets having a horizontal shaft; means connected with the shafts of said sprockets for intermittently driving the chain in an endless path; a stationary housing surrounding the chain and defining therewith a nearly completely sealed substantially annular chamber; a plurality of guideways, each connected to one link of said chain and each extending at right angles to the direction in which the chain is driven; a plurality of magazines, each removably holding a plurality of containers and each removably mounted in one of said guideways, said housing formed with aperture means permitting insertion and withdrawal of individual magazines from said chamber; and means for cleaning, filling and sealing the containers, said means mounted in the chamber partially below said chain and operable between successive advances of the chain, the extent to which said chamber is sealed being such that superatmospheric pressures develop in the chamber during cleaning, filling and sealing of containers whereby atmospheric air is prevented from penetrating into said chamber.

13. An apparatus for cleaning, filling and sealing of ampoules and like containers which comprises, in combination: an endless link chain having two spaced end turns, a horizontal upper run, and a horizontal lower run; a driving sprocket at each end turn of said chain, each of said sprockets having a horizontal shaft; means connected with the shafts of said sprockets for intermittently driving the chain in an endless path; a stationary housing surrounding the chain and defining therewith a nearly completely sealed substantially annular chamber; a plurality of guideways, each connected to one link of said chain and each extending at right angles to the direction in which the chain is driven; a plurality of magazines, each removably holding a plurality of containers and each removably mounted in one of said guideways, said housing formed with aperture means permitting insertion and withdrawal of individual magazines from said chamber; and means for cleaning, filling and sealing the containers, said cleaning means mounted in the chamber adjacent to the lower run of said chain and said filling and sealing means mounted in the chamber adjacent to the upper run of said chain, each of said means operable between successive advances of the chain, the extent to which said chamber is sealed being such that superatmospheric pressures develop in the chamber during cleaning, filling and sealing of containers whereby atmospheric air is prevented from penetrating into said chamber.

14. An apparatus for cleaning, filling and sealing of ampoules and like containers which comprises, in combination: an endless link chain having two spaced end turns, a horizontal upper run, and a horizontal lower run; a driving sprocket at each end turn of the chain; at least one intermediate sprocket disposed between said first mentioned sprockets and engaging with the upper and lower runs of said chain, each of said sprockets having a horizontal shaft; means connected with the shafts of said sprockets for imparting synchronous rotational movements to said sprockets and for thereby intermittently driving the chain in an endless path; a stationary housing surrounding the chain and defining therewith a nearly completely sealed substantially annular chamber; a plurality of guideways, each connected to one link of said chain and each extending at right angles to the direction in which the chain is driven; a plurality of magazines, each removably holding a plurality of containers and each removably mounted in one of said guideways, said housing formed with aperture means permitting insertion and withdrawal of individual magazines from said chamber; and means for cleaning, filling and sealing the containers, said cleaning means mounted in the chamber adjacent to the lower run of said chain and said filling and sealing means mounted in the chamber adjacent to the upper run of said chain, each of said means operable between successive advances of the chain, the extent to which said chamber is sealed being such that superatmospheric pressures develop in the chamber during cleaning, filling and sealing of containers whereby atmospheric air is prevented from penetrating into said chamber.

15. An apparatus for cleaning, filling and sealing of ampoules and like containers comprising, in combination: rotary conveying means mounted for movement in a substantially vertical plane; stationary housing means surrounding said conveying means and defining therewith a nearly completely sealed substantially annular chamber; a plurality of magazines, each removably holding a plurality of containers and each removably mounted on said conveying means for movements with the conveying means through said chamber, said housing means formed with aperture means of an area sufficient to permit insertion and withdrawal of individual magazines from said chamber; a drive for intermittently advancing the conveying means and for thereby moving the magazines with the containers in said chamber; at least one cleaning assembly for the containers mounted in said chamber and located beneath said conveying means; a filling assembly for containers mounted in said chambers; a sealing assembly for the containers mounted in said chamber; and separate drives for each of said assemblies, each said last mentioned drive operatively connected with said first mentioned drive for automatically operating the respective assembly between successive advances of said conveying means under the action of said first mentioned drive, the extent to which said chamber is sealed being such that superatmospheric pressures develop in the chamber during the cleaning, filling and sealing of containers whereby atmospheric air is prevented from penetrating into said chamber.

16. An apparatus for cleaning, filling and sealing of ampoules and like containers comprising, in combination: rotary conveying means mounted for movement in a substantially vertical plane; stationary housing means surrounding said conveying means and defining therewith a nearly completely sealed substantially annular chamber; a plurality of magazines, each removably holding a plurality of containers and each removably mounted on said conveying means for movements with the conveying means through said chamber, said housing means formed with aperture means of an area sufficient to permit insertion and withdrawal of individual magazines from said chamber; a drive for intermittently advancing the conveying means and for thereby moving the magazines with the containers in said chamber; at least one cleaning assembly for the containers mounted in said chamber below said conveying means; a filling assembly for the containers mounted in said chamber; a sealing assembly for the containers mounted in said chamber; and separate drives for each of said assemblies, each said last mentioned drive operating the respective assembly between successive advances of the conveying means under the action of said first mentioned drive, said first mentioned drive and said last mentioned drives mounted externally of said chamber, the extent to which said chamber is sealed being such that superatmospheric pressures develop in the chamber during the cleaning, filling and sealing of containers whereby atmospheric air is prevented from penetrating into said chamber.

17. An apparatus for cleaning, filling and sealing of ampoules and like containers of the type having a spear formed with an open end, said apparatus comprising, in combination: rotary conveying means mounted for movements in an endless path disposed in a substantially vertical plane; a plurality of guideways carried by said conveying means and extending at right angles to the direction in which the latter rotates; stationary housing means surrounding said conveying means and defining therewith a nearly completely sealed substantially annular chamber; a plurality of magazines, each removably holding a plurality of containers in such a way that the open ends of the spears are turned toward said housing means, each removably mounted in one of said guideways for movements with the conveying means through said chamber, and each having cutouts facing said housing means, said housing means formed with aperture means of an area sufficient to permit insertion and withdrawal of individual magazines from said chamber; a drive for intermittently advancing the conveying means and for thereby moving the magazines in said chamber; and means for cleaning, filling and sealing the containers, each of said last mentioned means mounted in said chamber and operable between successive advances of said conveying means, said cleaning means comprising at least one elongated distributor pipe parallel with said guideways, a plurality of hollow liquid-introducing needles carried by and communicating with said pipe, there being one needle for each container carried by a magazine, a source of liquid connected with said pipe, pump means for causing the liquid to flow from said source and through said pipe to be discharged through said needles, and means for reciprocating said pipe toward and away from a magazine between successive advances of said conveying means whereby the needles are introduced into and withdrawn from the open ends of spears forming part of the containers carried by the magazine, said reciprocating means comprising bolt means fixed to and extending beyond said pipe, each of said bolt means having a conical end extendable into a cutout of the magazine momentarily aligned with said pipe for fixing the magazine in position when the pipe is moved by said reciprocating means to introduce the needles into the open ends of the spears, the extent to which said chamber is sealed being such that super-atmospheric pressures develop in the chamber during the cleaning, filling and sealing of containers whereby atmospheric air is prevented from penetrating into said chamber.

18. An apparatus for cleaning, filling and sealing of ampoules and like containers of the type having a spear formed with an open end, the apparatus comprising, in combination: rotary conveying means mounted for rotation in an endless path disposed in a vertical plane; stationary housing means surrounding said conveying means and defining therewith a nearly completely sealed substantially annular chamber; a plurality of elongated magazines, each removably holding a plurality of containers in such position that the open ends of all spears are turned toward said housing and each removably mounted on said conveying means for movements with the conveying means through said chamber, said housing means formed with aperture means of an area sufficient to permit insertion and withdrawal of individual magazines from said chamber; a drive for intermittently advancing the conveying means and for thereby moving the magazines with the containers in said chamber whereby each container is held by the respective magazine in substantially upright position between at least two successive advances of the conveying means; at least one cleaning assembly for the containers mounted in said chamber at least partially below said conveying means and comprising a plurality of needles, one for each container carried by a magazine, a source of liquid connected with the needles, and means for reciprocating the needles toward and away from the containers whereby the needles are introduced into and withdrawn from the open ends of spears momentarily aligned therewith; a filling assembly for the containers mounted in and at such point of said chamber where the containers held in a magazine are in substantially upright position, said filling assembly comprising a plurality of filling needles, one for each container carried by a magazine, means for reciprocating the filling needles in unison toward and away from the open ends of spears forming part of containers held by a magazine in upright position, a separate conduit connected to each filling needle, and a separate pumping device for each conduit adapted to introduce measured quantities of a liquid substance into the spears of containers held by a magazine in upright position; a sealing assembly adjacent to said filling assembly for closing the open ends of spears forming part of containers filled by said filling needles; and separate drives for each of said assemblies for operating the assemblies between successive advances of said conveying means under the action of said first mentioned drive, the extent to which said chamber is sealed being such that super-atmospheric pressures develop in the chamber during the cleaning, filling and sealing of containers whereby atmospheric air is prevented from penetrating into said chamber.

19. An apparatus for cleaning, filling and sealing of ampoules and like containers of the type having a spear formed with an open end, said apparatus comprising, in combination: rotary conveying means mounted for movements in an endless path disposed in a substantially vertical plane; a plurality of guideways carried by said conveying means and extending at right angles to the direction in which the latter rotates; stationary housing means surrounding said conveying means and defining therewith a nearly completely sealed substantially annular chamber, said housing means comprising two spaced parallel end walls disposed at right angles to said guideways; a plurality of magazines, each removably holding a plurality of containers in such a way that the open ends of the spears are turned toward said housing means and each magazine removably mounted in one of said guideways for movements through said chamber, said housing means formed with aperture means of an area sufficient to permit insertion and withdrawal of individual magazines from said chamber; a drive for intermittently advancing the conveying means and for thereby moving the magazines in said chamber; and means for cleaning, filling and sealing the containers, each of said last mentioned means mounted in said chamber and operable between successive advances of said conveying means, at least one of said last mentioned means disposed at least partially below said conveying means, said cleaning means comprising at least one elongated distributor pipe parallel with said guideways, a plurality of hollow liquid-introducing needles carried by and communicating with said pipe, there being one needle for each container carried by a magazine, a source of liquid connected with said pipe, pump means for causing the liquid to flow from said source and through said pipe to be discharged through said needles, and means for reciprocating said pipe toward and away from a magazine between successive advances of said conveying means whereby the needles are introduced into and withdrawn from the open ends of spears forming part of the containers carried by the magazine, said reciprocating means comprising a pair of bolts parallel with said needles, connected to said pipe and each adjacent to one of said end walls, a rotatable disc externally adjacent to each of said end walls, means for angularly displacing each disc, and a link train connecting each disc with one of said bolts for reciprocating the same, the extent to which said chamber is sealed being such that superatmospheric pressures develop in the chamber during the cleaning, filling and sealing of containers whereby atmospheric air is prevented from penetrating into said chamber.

20. An apparatus for cleaning, filling and sealing of ampoules and like containers of the type having a spear formed with an open end, said apparatus comprising, in combination: rotary conveying means mounted for movements in an endless path disposed in a substantially vertical plane; a plurality of guideways carried by said conveying means and extending at right angles to the direction in which the latter rotates; stationary housing means surrounding said conveying means and defining therewith a nearly completely sealed substantially annular chamber, said housing means comprising two spaced parallel end walls disposed at right angles to said guideways; a plurality of magazines, each removably holding a plurality of containers in such a way that the open ends of the spears are turned toward said housing means and each magazine removably mounted in one of said guideways for movements through said chamber, said housing means formed with aperture means of an area sufficient to permit insertion and withdrawal of individual magazines from said chamber; a drive for intermittently advancing the conveying means and for thereby moving the magazines in said chamber; and means for cleaning, filling and sealing the containers, each of said last mentioned means mounted in said chamber and operable between successive advances of said conveying means, at least one of said last mentioned means disposed at least partially below said conveying means, said cleaning means comprising at least one elongated distributor pipe parallel with said guideways, a plurality of hollow liquid-introducing needles carried by and communicating with said pipe, there being one needle for each container carried by a magazine, a source of liquid connected with said pipe, pump means for causing the liquid to flow from said source and through said pipe to be discharged through said needles, and means for reciprocating said pipe toward and away from a magazine between successive advances of said conveying means whereby the needles are introduced into and withdrawn from the open ends of spears forming part of the containers carried by the magazine, said reciprocating means comprising at least one bolt parallel with said needles and connected to said pipe, a rotatable disc externally adjacent to one of said end walls, means for angularly displacing said disc, and a link train connecting said bolt with said disc whereby angular movements of the disc bring about reciprocation of the bolt and of said pipe toward and away from a magazine between successive advances of said conveying means, the extent to which said chamber is sealed being such that superatmospheric pressures develop in the chamber during the cleaning, filling and sealing of containers whereby atmospheric air is prevented from penetrating into said chamber.

21. An apparatus for cleaning, filling and sealing of ampoules and like containers of the type having a spear formed with an open end, said apparatus comprising, in combination: rotary conveying means mounted for movements in an endless path disposed in a vertical plane; a plurality of guideways carried by said conveying means and extending at right angles to the direction in which the latter rotates; stationary housing means surrounding said conveying means and defining therewith a nearly completely sealed substantially annular chamber, said housing means comprising two spaced parallel end walls disposed at right angles to said guideways; a plurality of equally spaced radial partitions connected to said housing means and extending between said end walls inwardly toward but short of said conveying means for subdividing the chamber into a plurality of compartments with at least one of the compartments disposed below said conveying means; a plurality of elongated magazines, each removably holding a plurality of containers in such a way that the open ends of the spears are turned toward said housing means and each removably mounted in one of said guideways for movements with the conveying means through said chamber, said housing means formed with aperture means of an area sufficient to permit insertion and withdrawal of individual magazines from said chamber; a drive for intermittently advancing the conveying means and for thereby moving the magazines into successive compartments of said chamber; and means for cleaning, filling and sealing the containers, each of said last mentioned means mounted in a separate compartment of said chamber and operable between successive advances of said conveying means, at least one of said last mentioned means being mounted in a compartment disposed below said conveying means and the extent to which said chamber is sealed being such that superatmospheric pressures develop in the chamber during the cleaning, filling and sealing of containers whereby atmospheric air is prevented from penetrating into said chamber, said cleaning means comprising at least one elongated distributor pipe parallel with said guideways, a plurality of hollow needles carried by and communicating with said pipe, there being one needle for each container carried by a magazine, a source of liquid connected to said pipe, pump means for causing the liquid to flow from said source into said needles, means for reciprocating said pipe toward and away from a magazine between successive advances of said conveying means whereby the needles are introduced into and withdrawn from the open ends of spears forming part of containers carried by a magazine, and a baffle plate connected to and reciprocable with said pipe, said baffle plate slidable along and beyond a partition in the compartment of said pipe in a diretcion toward said conveying means for preventing the flow of liquid discharged by said needles into another compartment.

22. An apparatus for cleaning, filling and sealing of ampoules and like containers of the type having a spear formed with an open end, said apparatus comprising, in combination: rotary conveying means mounted for movements in an endless path disposed in a vertical plane; a plurality of guideways carried by said conveying means and extending at right angles to the direction in which the latter rotates; stationary housing means surrounding said conveying means and defining therewith a nearly completely sealed substantially annular chamber, said housing means comprising two spaced parallel end walls disposed at right angles to said guideways; a plurality of equally spaced radial partitions connected to said housing means and extending between said end walls inwardly toward but short of said conveying means for subdividing the chamber into a plurality of compartments with at least one of the compartments disposed below said conveying means; a plurality of elongated magazines, each removably holding a plurality of containers in such a way that the open ends of the spears are turned toward said housing means and each removably mounted in one of said guideways for movements with the conveying means through said chamber, said housing means formed with aperture means of an area sufficient to permit insertion and withdrawal of individual magazines from said chamber; a drive for intermittently advancing the conveying means and for thereby moving the magazines into successive compartments of said chamber; a plurality of equally spaced substantially radial dividers carried by said conveying means, each divider parallel with said guideways and extending toward but short of one of said partitions whereby the dividers and said partitions define elongated gaps between successive advances of said conveying means; and means for cleaning, filling and sealing the containers, each of said last mentioned means mounted in a separate compartment of said chamber and operable between successive advances of said conveying means, at least one of said last mentioned means being mounted in a compartment disposed below said conveying means and the extent to which said chamber is sealed being such that superatmospheric pressures develop in the chamber during the cleaning, filling and sealing of containers whereby atmospheric air is prevented from penetrating into said chamber, said cleaning means comprising at least one elongated distributor pipe parallel with said guideways, a plurality of hollow needles carried by and communicating with said pipe, there being one needle for each container carried by a magazine, a source of liquid connected to said pipe, pump means for causing the liquid to flow from said source into said needles, means for reciprocating said pipe toward and away from a magazine between successive advances of said conveying means whereby the needles are introduced into and withdrawn from the open ends of spears forming part of containers carried by a magazine, and a baffle plate connected to and reciprocable with said pipe, said baffle plate slidable along and beyond a partition in the compartment of said pipe in a direction toward said conveying means for closing the gap formed between said last mentioned partition and one of said dividers and for thereby preventing the flow of liquid discharged by said needles into another compartment.

23. An apparatus for cleaning, filling and sealing of ampoules and like containers of the type having a main body portion and an open-ended spear connected to and forming a shoulder with the body portion, the apparatus comprising, in combination: rotary conveying means mounted for movements in an endless path in a vertical plane; a plurality of elongated guideways carried by said conveying means and extending at right angles to the direction in which the latter rotates; stationary housing means surrounding said conveying means and defining therewith a nearly completely sealed substantially annular chamber; a plurality of elongated magazines each removably holding a plurality of containers in such a way that the open ends of spears are turned toward said housing means, each magazine comprising a first plate member removably held by one of said guideways, a second plate member fixed in spaced position to said first member, a third plate member supported by said first and second members and movable toward and away from the second member, and resilient means for constantly biasing the third member in a direction away from the second member, said first member formed with openings for snugly receiving the body portions of containers and the other two members formed with openings for permitting passage of the spears with the second member abutting against the shoulders between the spears and body portions of containers and the third member engaging the open end portions of the spears when moved by said resilient means in a direction away from the second member, said housing means formed with aperture means of an area sufficient to permit insertion and withdrawal of individual magazines from said chamber; a drive for intermittently advancing the conveying means and for thereby moving the magazines with the containers in said chamber, the containers held by each magazine being maintained in substantially upright position between at least two successive advances of said conveying means; at least one cleaning assembly for the containers mounted in said chamber and disposed at least partially below said conveying means; a filling assembly for the containers mounted in and at such point of the chamber where the containers are held in substantially upright position; a sealing assembly for the containers adjacent to said filling assembly and also mounted in and at such point of the chamber where the containers are in substantially upright position, said sealing assembly comprising bolt means reciprocable toward the third plate member of a magazine adjacent thereto for moving the third plate member against the bias of the respective resilient means toward the corresponding second plate member and for thereby exposing the spears of containers carried by the last mentioned magazine; and separate drive means for operating said assemblies between successive advances of said conveying means, the extent to which said chamber is sealed being such that superatmospheric pressures develop in the chamber during the cleaning, filling and sealing of containers whereby atmospheric air is prevented from penetrating into said chamber.

24. An apparatus for cleaning, filling and sealing of ampoules and like containers of the type comprising a main body portion and an open-ended spear connected to the body portion, the apparatus comprising, in combination: an endless link chain having two spaced end turns, a horizontal upper run, and a horizontal lower run; a driving sprocket at each end turn of the chain, each of said sprockets having a horizontal shaft; means connected with the shafts of said sprockets for intermittently driving the chain in an endless path; a stationary housing surrounding the chain and defining therewith a nearly completely sealed substantially annular chamber; a plurality of guideways, each connected to one link of said chain and each extending at right angles to the direction in which the chain is driven; a plurality of magazines, each removably holding a plurality of containers in such a way that the open ends of the spears are turned toward said housing and each removably mounted in one of said guideways, said housing means formed with aperture means of an area sufficient to permit insertion and withdrawal of individual magazines from said chamber; at least one cleaning assembly for the containers mounted in said chamber adjacent to the lower run of the chain; a filling assembly in the chamber adjacent to the upper run of said chain; a sealing assembly for the containers in the chamber adjacent to said filling assembly; and separate drives for operating said assemblies between intermittent advances of said chain, said cleaning and filling assemblies comprising a plurality of needles for introducing a liquid into the open ends of the spears, bolt means for reciprocating the needles toward and away from the spears, and separate actuating means for reciprocating the bolt means along the upper run and along the lower run of said chain, the extent to which said chamber is sealed being such that superatmospheric pressures develop in the chamber during the cleaning, filling and sealing of containers whereby atmospheric air is prevented from penetrating into said chamber.

25. An apparatus for cleaning, filling and sealing of ampoules and like containers of the type comprising a main body portion and an open-ended spear connected with the body portion, the apparatus comprising, in combination: conveying means mounted for rotary movements in an endless path disposed in a substantially vertical plane; a drive for intermittently rotating the conveying means; guideways carried by said conveying means and extending at right angles to the direction in which the conveying means is rotated; a housing surrounding the conveying means and defining therewith a nearly completely sealed substantially annular chamber; a plurality of magazines, each removably mounted in one of said guideways and each holding a plurality of containers in such a way that the open ends of spears are turned toward said housing, each magazine movable by the conveying means through said chamber in such a way as to maintain the containers in substantially upright position between at least two successive rotations of the conveying means, said housing formed with aperture means of such area as to permit insertion and withdrawal of individual magazines from said chamber; cleaning means for the containers mounted in said chamber at least partially below said conveying means; filling means for the containers mounted in and at such a point of the chamber where the containers are maintained in substantially upright position; and sealing means for the containers mounted in said chamber and adjacent to the filling means, said sealing means comprising a plurality of grippers and burners, one for each container carried by a magazine, a first and a second lever pivotably mounting said grippers and said burners, respectively, for movements toward and away from the spears, means for operating the first lever whereby to move the grippers into and out of engagement with the open-ended portions of the spears, and stop means carried by the first lever and engageable with the second lever for moving the burners when the latter's open-ended portions are engaged by the grippers and the first lever moves the grippers in a direction away from the conveying means, the extent to which said chamber is sealed being such that superatmospheric pressures develop in the chamber during the cleaning filling and sealing of containers whereby atmospheric air is prevented from penetrating into said chamber.

26. An apparatus for cleaning, filling and sealing of ampoules and like containers of the type comprising a main body portion and an open-ended spear connected with the body portion, the apparatus comprising, in combination: conveying means mounted for rotary movements in an endless path disposed in a substantially vertical plane; a drive for intermittently rotating the conveying means; guideways carried by said conveying means and extending at right angles to the direction in which the conveying means is rotated; a housing surrounding the conveying means and defining therewith a nearly completely sealed substantially annular chamber; a plurality of magazines, each removably mounted in one of said guideways and each holding a plurality of containers in such a way that the open ends of spears are turned toward said housing, each magazine movable by the conveying means through said chamber in such a way as to maintain the containers in substantially upright position between at least two successive rotations of the conveying means, said housing formed with aperture means of such area as to permit insertion and withdrawal of individual magazines from said chamber; cleaning means for the containers mounted in said chamber at least partially below said conveying means; filling means for the containers mounted in and at such a point of the chamber where the containers are maintained in substantially upright position; and sealing means for the containers mounted in said chamber and adjacent to the filling means, said sealing means comprising a plurality of grippers and burners, one for each container carried by a magazine, a first and a second lever pivotably mounting said grippers and each gripper comprising a rod and a wire member movable toward the rod for engaging the open-ended portion of a spear therebetween, first shaft means parallel with said guideways and mounting said rods, second shaft means parallel with the first shaft means and mounting said wires, meshing gear means on said shaft means for transmitting rotation of one shaft means to the other shaft means, first pivotable lever means mounted in said housing and rotatably supporting said shaft means, means for rotating said one shaft means with respect to the first lever means, means for pivoting the first lever means, second lever means pivotably mounted in said housing and pivotably mounting said burners for movements toward and away from the spears, and stop means carried by the first lever means and engaging with the second lever means for moving the burners when the first lever means moves the grippers in a direction away from the conveying means, the extent to which said chamber is sealed being such that superatmospheric pressures develop in the chamber during the cleaning, filling and sealing of containers whereby atmospheric air is prevented from penetrating into said chamber.

27. An apparatus for cleaning, filling and sealing of ampoules and like containers of the type comprising a main body portion and an open-ended spear connected with the body portion, the apparatus comprising, in combination: conveying means mounted for rotary movements in an endless path disposed in a substantially vertical plane; a drive for intermittently rotating the conveying means; guideways carried by said conveying means and extending at right angles to the direction in which the conveying means is rotated; a housing surrounding the conveying means and defining therewith a nearly completely sealed substantially annular chamber; a plurality of magazines, each removably mounted in one of said guideways and each holding a plurality of containers in such a way that the open ends of spears are turned toward said housing, each magazine movable by the conveying means through said chamber in such a way as to maintain the containers in substantially upright position between at least two successive rotations of the conveying means, said housing formed with aperture means of such area as to permit insertion and withdrawal of individual magazines from said chamber; cleaning means for the containers mounted in said chamber at least partially below said conveying means; filling means for the containers mounted in and at such a point of the chamber where the containers are maintained in substantially upright position; and sealing means for the containers mounted in said chamber and adjacent to the filling means, said sealing means comprising a plurality of grippers and burners, one for each container carried by a magazine, each gripper comprising a rod of circular cross section and formed with a substantially segmental groove and a wire member having a bent end portion with said wire member movable toward the rod for engaging the open-ended portion of a spear received in said groove, first shaft means parallel with said guideways and mounting said rods, second shaft means parallel with the first shaft means and mounting said wires, meshing gear means on said shaft means for transmitting rotation of one shaft means to the other shaft means, first pivotable lever means mounted on said housing and rotatably supporting said shaft means, means for rotating said one shaft means with respect to the first lever means, means for pivoting the first lever means, second lever means pivotably mounted in said housing and mounting said burners for movements toward and away from the spears, and stop means carried by the first lever means and engaging with the second lever means for moving the burners when the first lever means moves the grippers in a direction away from the conveying means, the extent to which said chamber is sealed being such that superatmospheric pressures develop in the chamber during the cleaning, filling and sealing of containers whereby atmospheric air is prevented from penetrating into said chamber.

28. An apparatus for cleaning, filling and sealing of ampoules and like containers comprising, in combination: rotary conveying means mounted for movement in a substantially vertical plane; stationary housing means surrounding said conveying means and defining therewith a nearly completely sealed substantially annular chamber, said housing means having an upper half and a lower half and a pair of aligned apertures in said upper half; a plurality of magazines each removably holding a plurality of containers and each removably mounted on said conveying means for movements through said chamber, said magazines individually insertable into said space through one of said apertures and adapted to be discharged from the chamber through the other aperture; a drive for intermittently advancing the conveying means and for thereby moving the magazines with the containers in said chamber; and means for cleaning, filling and sealing the containers, said last mentioned means mounted in said chamber, disposed partially below said conveying means and operable between successive advances of said conveying means, the extent to which said chamber is sealed being such that superatmospseric pressures develop in the chamber during the cleaning, filling and sealing of containers whereby atmospheric air is prevented from penetrating into said chamber.

29. An apparatus for cleaning, filling and sealing of ampoules and like containers comprising, in combination: a horizontal shaft; a conveying drum having a cylindrical mantle and rotatably mounted on said shaft; a cylindrical housing surrounding said drum and defining with the latter a nearly completely sealed annular chamber extending about said mantle, said housing comprising a pair of spaced substantially vertical walls disposed at right angles to said shaft and formed with aligned apertures at a level above the level of said shaft; a plurality of guideways mounted on said mantle and each parallel with said shaft; a plurality of elongated magazines each removably holding a plurality of containers and each removably mounted in one of said guideways for movements through said chamber, each magazine individually insertable into the chamber through one of said apertures and adapted to be discharged longitudinally of its guideway through the other aperture; a drive for intermittently rotating the drum and for thereby moving the magazines with the containers in said chamber; and means for cleaning, filling and sealing the containers, said means mounted on the housing, located in said chamber partially below said drum and operable between successive rotations of said drum, the extent to which said chamber is sealed being such that superatmospheric pressures develop in the chamber during cleaning, filling and sealing of containers whereby atmospheric air is prevented from penetrating into said chamber.

References Cited in the file of this patent

UNITED STATES PATENTS

| | | |
|---|---|---|
| 2,530,230 | Cozzoli | Nov. 14, 1950 |
| 2,749,688 | Cozzoli | June 12, 1956 |
| 2,831,301 | Martell | Apr. 22, 1958 |
| 2,877,611 | Anrep | Mar. 17, 1959 |
| 2,896,381 | Lange | July 28, 1959 |
| 2,908,124 | Hagen | Oct. 13, 1959 |

UNITED STATES PATENT OFFICE
CERTIFICATE OF CORRECTION

Patent No. 3,007,294                      November 7, 1961

Joseph Hagen et al.

It is hereby certified that error appears in the above numbered patent requiring correction and that the said Letters Patent should read as corrected below.

In the grant, lines 1 and 2, for "Joseph Hagen, of Burscheid, Germany, and Wilhelm Pechmann, of Birsfelden, Switzerland," read -- Joseph Hagen, of Birsfelden, Switzerland, and Wilhelm Pechmann, of Burscheid, Germany, --; in the heading to the printed specification, lines 5 and 6, for "Joseph Hagen, Burscheid, Germany, and Wilhelm Pechmann, Birsfelden, Switzerland," read -- Joseph Hagen, Birsfelden, Switzerland, and Wilhelm Pechmann, Burscheid, Germany, --.

Signed and sealed this 19th day of March 1963.

(SEAL)
Attest:

ESTON G. JOHNSON
Attesting Officer

DAVID L. LADD
Commissioner of Patents